US008196848B2

(12) United States Patent
Sprouse et al.

(10) Patent No.: US 8,196,848 B2
(45) Date of Patent: Jun. 12, 2012

(54) GASIFIER INJECTOR

(75) Inventors: Kenneth M Sprouse, Northridge, CA (US); Shahram Farhangi, Woodland Hills, CA (US); David R Matthews, Simi Valley, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1720 days.

(21) Appl. No.: 11/117,911

(22) Filed: Apr. 29, 2005

(65) Prior Publication Data

US 2006/0242907 A1 Nov. 2, 2006

(51) Int. Cl.
*A62C 2/08* (2006.01)
*B05B 1/14* (2006.01)
*B01J 7/00* (2006.01)

(52) U.S. Cl. ............................. 239/548; 239/556; 48/61

(58) Field of Classification Search .................... 48/104, 48/61; 239/548, 556

See application file for complete search history.

(56) References Cited

U.S. PATENT DOCUMENTS

| | | | | |
|---|---|---|---|---|
| 1,708,496 A | | 4/1929 | Cledon | |
| 2,380,463 A | | 7/1945 | Poole | |
| 2,751,286 A | | 8/1951 | Totzek | |
| 3,793,861 A | * | 2/1974 | Burkhard et al. | 62/315 |
| 3,856,658 A | | 12/1974 | Wolk et al. | |
| 4,080,550 A | * | 3/1978 | Sheer et al. | 315/111.21 |
| 4,191,500 A | | 3/1980 | Oberg et al. | |
| 4,197,092 A | | 4/1980 | Bretz | |
| 4,206,610 A | | 6/1980 | Santhanam | |
| 4,356,078 A | | 10/1982 | Heavin et al. | |
| 4,377,356 A | | 3/1983 | Santhanam | |
| 4,391,561 A | | 7/1983 | Smith et al. | |

(Continued)

FOREIGN PATENT DOCUMENTS

EP 0130630 5/1984

(Continued)

OTHER PUBLICATIONS

K. M. Sprouse and M. D. Schuman, Dense-Phase Feeding of Pulverized Coal in Uniform Plug Flow, Nov. 1983, pp. 1000-1006 and reference page.

(Continued)

*Primary Examiner* — Matthew Merkling

(74) *Attorney, Agent, or Firm* — Carlson, Gaskey & Olds, P.C.

(57) ABSTRACT

A gasifier injection module includes a two-stage slurry splitter and an injector face plate with a coolant system incorporated therein. The two-stage slurry splitter includes a main cavity into which a main slurry flow is provided. The main cavity includes a plurality of first stage flow dividers that divide the main slurry flow into a plurality of secondary slurry flows that flow into a plurality of secondary cavities that extend from the main cavity. Each secondary cavity includes a plurality of second stage flow dividers that divide each secondary slurry flow into a plurality of tertiary slurry flows that flow into a plurality of slurry injection tubes extending from the secondary cavities. The tertiary flows are injected as high pressure slurry streams into the gasification chamber via the slurry injection tubes. A reactant is impinged at high pressure, as an annular shaped spray, on each high pressure slurry stream via a plurality of annular impinging orifices incorporated into the injector face plate. The coolant system incorporated within the injector face plate maintains the injector face plate at a temperature sufficient to substantially reduce or prevent damage to the injector face plate by high temperatures and/or abrasive matter created by the resulting gasification reaction.

19 Claims, 7 Drawing Sheets

U.S. PATENT DOCUMENTS

| | | | |
|---|---|---|---|
| 4,488,838 | A | 12/1984 | Herud |
| 4,536,603 | A | 8/1985 | Sprouse et al. |
| 4,721,420 | A | 1/1988 | Santhanam et al. |
| 4,731,989 | A | 3/1988 | Furuya et al. |
| 4,870,824 | A | 10/1989 | Young et al. |
| 5,281,128 | A | 1/1994 | Dalla Betta et al. |
| 5,309,537 | A | 5/1994 | Chun et al. |
| 5,461,864 | A | 10/1995 | Betta et al. |
| 5,511,972 | A | 4/1996 | Dalla Betta et al. |
| 5,512,250 | A | 4/1996 | Dalla Betta et al. |
| 5,518,697 | A | 5/1996 | Dalla Betta et al. |
| 5,558,473 | A | 9/1996 | Lindahl |
| 5,577,906 | A | 11/1996 | Hanakata et al. |
| 5,709,077 | A | 1/1998 | Beichel |
| 5,715,673 | A | 2/1998 | Beichel |
| 5,899,679 | A | 5/1999 | Euzen et al. |
| 5,956,937 | A | 9/1999 | Beichel |
| 5,970,702 | A | 10/1999 | Beichel |
| 6,152,668 | A | 11/2000 | Knoch |
| 6,170,264 | B1 | 1/2001 | Viteri et al. |
| 6,174,159 | B1 | 1/2001 | Smith et al. |
| 6,192,688 | B1 | 2/2001 | Beebe |
| 6,202,402 | B1 | 3/2001 | Sattelmayer |
| 6,205,768 | B1 | 3/2001 | Dibble et al. |
| 6,220,790 | B1 | 4/2001 | Schenk et al. |
| 6,253,539 | B1 * | 7/2001 | Farhangi et al. ................ 60/211 |
| 6,358,040 | B1 | 3/2002 | Pfefferle et al. |
| 6,415,608 | B1 | 7/2002 | Newburry |
| 6,584,760 | B1 | 7/2003 | Lipinski et al. |
| 6,682,838 | B2 | 1/2004 | Stevens |
| 6,790,430 | B1 | 9/2004 | Lackner et al. |
| 2002/0139119 | A1 | 10/2002 | Touchton et al. |
| 2003/0056519 | A1 | 3/2003 | Newburry |
| 2004/0005239 | A1 * | 1/2004 | Szakalos et al. .............. 420/489 |
| 2004/0050982 | A1 * | 3/2004 | Sprouse et al. ............... 239/596 |

FOREIGN PATENT DOCUMENTS

| | | |
|---|---|---|
| EP | 0 304 707 | 5/1988 |
| EP | 0 889 289 | 6/1998 |
| GB | 316667 | 5/1930 |
| JP | 58-179730 | 10/1983 |
| JP | 59-107119 | 6/1984 |
| JP | 60-66022 | 4/1985 |
| JP | 60-64131 | 12/1985 |
| WO | WO 02/27243 | 4/2002 |

OTHER PUBLICATIONS

Catalytica, How it Works, http://www.catalyticaenergy.com/xonon/how_it_works.html, printed Feb. 6, 2002.

* cited by examiner

GASIFIER INJECTOR

CROSS-REFERENCE TO RELATED APPLICATIONS

The present application is related in general subject matter to U.S. Patent Application Publication No. 2004/0071618, titled Method and Apparatus For Continuously Feeding And Pressurizing A Solid Material Into A High Pressure System, filed Oct. 15, 2003, assigned to The Boeing Co., and hereby incorporated by reference into the present application. The subject matter of the present application is also related to U.S. patent application Ser. No. 10/677,817, titled Regeneratively Cooled Synthesis Gas Generator, filed Oct. 2, 2003, presently allowed, the disclosure of which is also hereby incorporated by reference. Additionally, the subject matter of the present invention is related to U.S. patent application Ser. No. 11/081,144, titled Compact High Efficiency Gasifier, filed Mar. 16, 2005. Finally, the subject matter of the present application is related to U.S. patent Ser. No. 11/118,996, titled High Pressure Dry Coal Slurry Extrusion Pump, filed concurrently herewith, the disclosure of which is also hereby incorporated by reference into the present application.

FIELD OF INVENTION

The invention relates generally to gasification of carbonaceous materials, such as coal or petcoke. More particularly, the invention relates to an injection device and method used to achieve a high rate of efficiency in the gasification of such carbonaceous materials.

BACKGROUND OF THE INVENTION

Electricity and electrically powered systems are becoming ubiquitous and it is becoming increasingly desirable to find sources of power. For example, various systems may convert various petrochemical compounds, e.g. carbonaceous materials such as coal and petcoke, into electrical energy. Further, such petrochemical compounds are used to create various other materials such as steam that are used to drive steam powered turbines.

The gasification of carbonaceous materials such as coal and petcoke into synthesis gas (syngas), e.g. mixtures of hydrogen and carbon monoxide, is a well-known industrial process used in the petrochemical and gas power turbine industries. Over the last 20 years, entrained flow coal gasifiers have become the leading process in the production of synthesis gas. However, these entrained flow gasifiers fail to make use of rapid mix injector technology. The failure to use such technologies causes gasifier volumes and gasifier capital costs to be much higher than necessary. Rapid mix injector technology is expected to reduce these entrained flow gasifier volumes by about one order of magnitude, i.e. by a factor of 10. Getting the overall capital cost of these coal gasifiers down by significantly reducing gasifier volumes is very desirable.

Since 1975, Rocketdyne has designed and tested a number of rapid mix injectors for coal gasification. Most of these designs and test programs were conducted under U.S. Department of Energy contracts between 1975 and 1985. The primary workhorse injector used on these DOE programs was the multi-element pentad. Each pentad (4-on-1) element used four high velocity gas streams which impinged onto a central coal slurry stream. The four gas stream orifices were placed 90 degrees apart from each other on a circle surrounding the central coal slurry orifice. The impingement angle between a gas jet and the central coal slurry stream was typically 30 degrees. Each pentad element was sized to flow approximately 4-tons/hr (i.e., 100 tons/day) of dry coal so that a commercial gasifier operating at a 3,600 ton/day capacity would use approximately 36 pentad elements.

Generally, known rapid mix injectors for coal gasification that impinge oxygen gas or a mixture of oxygen and steam on a slurry stream are effective, but degrade quickly because of the high coal/oxygen combustion temperatures that occur very close to the injector face under local oxidation environmental conditions. These combustion temperatures can exceed 5,000° F. in many instances. Additionally, such known rapid mix injectors are susceptible to plugging within the coal slurry stream.

BRIEF SUMMARY OF THE INVENTION

A gasifier having a gasification chamber and an injection module that includes a two-stage slurry splitter and an injector face plate with a coolant system incorporated therein is provided, in accordance with a preferred embodiment of the present invention. The injector module is utilized to inject a high pressure slurry stream into the gasification chamber and impinge a high pressure reactant with the high pressure slurry stream within the gasification chamber to generate a gasification reaction that converts the slurry into a synthesis gas.

The two-stage slurry splitter includes a main cavity into which a main slurry flow is provided. The main cavity includes a plurality of first stage flow dividers that divide the main slurry flow into a plurality of secondary slurry flows that flow into a plurality of secondary cavities that extend from the main cavity at distal ends of the first stage flow dividers. Each secondary cavity includes a plurality of second stage flow dividers that divide each secondary slurry flow into a plurality of tertiary slurry flows that flow into a plurality of slurry injection tubes extending from the secondary cavities at distal ends of the second stage flow dividers. The tertiary flows are injected as high pressure slurry streams into the gasification chamber via the slurry injection tubes. The reactant is impinged at high pressure on each high pressure slurry stream via a plurality of annular impinging orifices incorporated into the injector face plate. Each annular impinging orifice surrounds a corresponding one of the slurry injection tubes, which extend through the injector face plate. Particularly, each annular impinging orifice produces a high pressure annular shaped spray that circumferentially impinges the corresponding slurry stream from 360°. That is, the slurry stream has a full 360° of the reactant impinging it.

The resulting gasification reaction generates extremely high temperatures and abrasive matter, e.g. slag, at or near the injector face plate. However, the coolant system incorporated within the injector face plate maintains the injector face plate at a temperature sufficient to substantially reduce or prevent damage to the injector face plate by the high temperature and/or abrasive matter.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
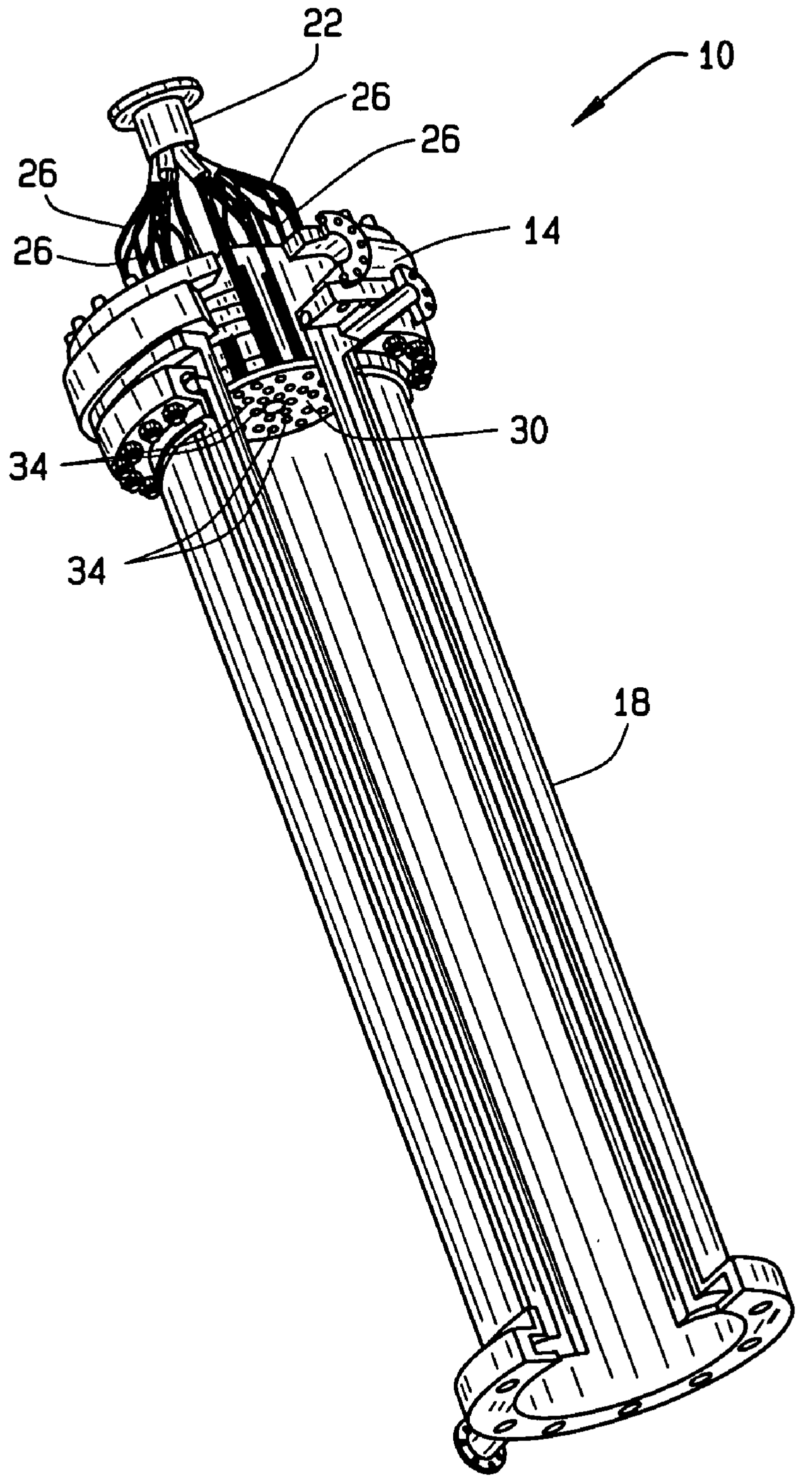
FIG. 1 is an isometric view of a gasifier system including an injector module and a gasification chamber, in accordance with a preferred embodiment of the present invention.

FIG. 1 illustrates a gasifier system 10 including an injector module 14 coupled to a gasification chamber 18. The injector module 14 is adapted to inject a high pressure slurry stream into the gasification chamber 18 and impinge a high pressure reactant onto the high pressure slurry stream to generate a gasification reaction within the gasification chamber 18 that converts the slurry into a synthesis gas. More specifically, the injector module 14 mixes a carbonaceous material, such as coal or petcoke, with a slurry medium, such as nitrogen $N_2$, carbon dioxide $CO_2$ or a synthesis gas, for example, a mixture of hydrogen and CO, to form the slurry. The injector module 14 then injects the slurry, at a pressure, into the gasification chamber 18 and substantially simultaneously, injects other reactants, such as oxygen and steam, into the gasification chamber 18. Particularly, the injector module 14 impinges the other reactants on the slurry causing a gasification reaction that produces high energy content synthesis gas, for example, hydrogen and carbon monoxide.

The injector module 14, as described herein, and the gasification chamber 18 can each be subsystems of a complete gasification system capable of producing a syngas from a carbonaceous material such as coal or petcoke. For example, the injector module 14 and the gasification chamber 18 can be subsystems, i.e. components, of the compact, highly efficient single stage gasifier system described in a co-pending patent application Ser. No. 11/081,144, titled Compact High Efficiency Gasifier, filed Mar. 16, 2005 and assigned to The Boeing Company, which is incorporated herein by reference.

The injector module 14 includes a two-stage slurry splitter 22 and a plurality of slurry injection tubes 26 extending from the two-stage slurry splitter 22 and through an injector face plate 30. In an exemplary embodiment, the injector module 14 includes thirty six slurry injection tubes 26. The slurry injections tubes 26 transport high pressure slurry flows from the injection module 14 and inject the slurry into the gasification chamber 18. More specifically, the slurry injection tubes 26 are substantially hollow tubes, open at both ends to allow effectively unobstructed flow of the slurry. That is, there is no metering of the slurry as it flows through the slurry injection tubes 26. Additionally, the flow of slurry through the slurry injection tubes 26 is a dense phase slurry flow. The injector face plate 30 includes a cooling system for cooling the face plate 30 so that the face plate 30 will withstand high temperatures and abrasion generated by the gasification reaction. The injector module 14 additionally includes a plurality of annular impinging orifices 34 incorporated into the injector face plate 30. The annular impinging orifices 34 are more clearly shown in FIGS. 4 and 5. Each annular impinging orifice 34 surrounds a corresponding one of the slurry injection tubes 26 and is adapted to impinge the reactant onto the slurry stream injected by the corresponding slurry injection tube 26, thereby generating the gasification reaction.

Figure 2:
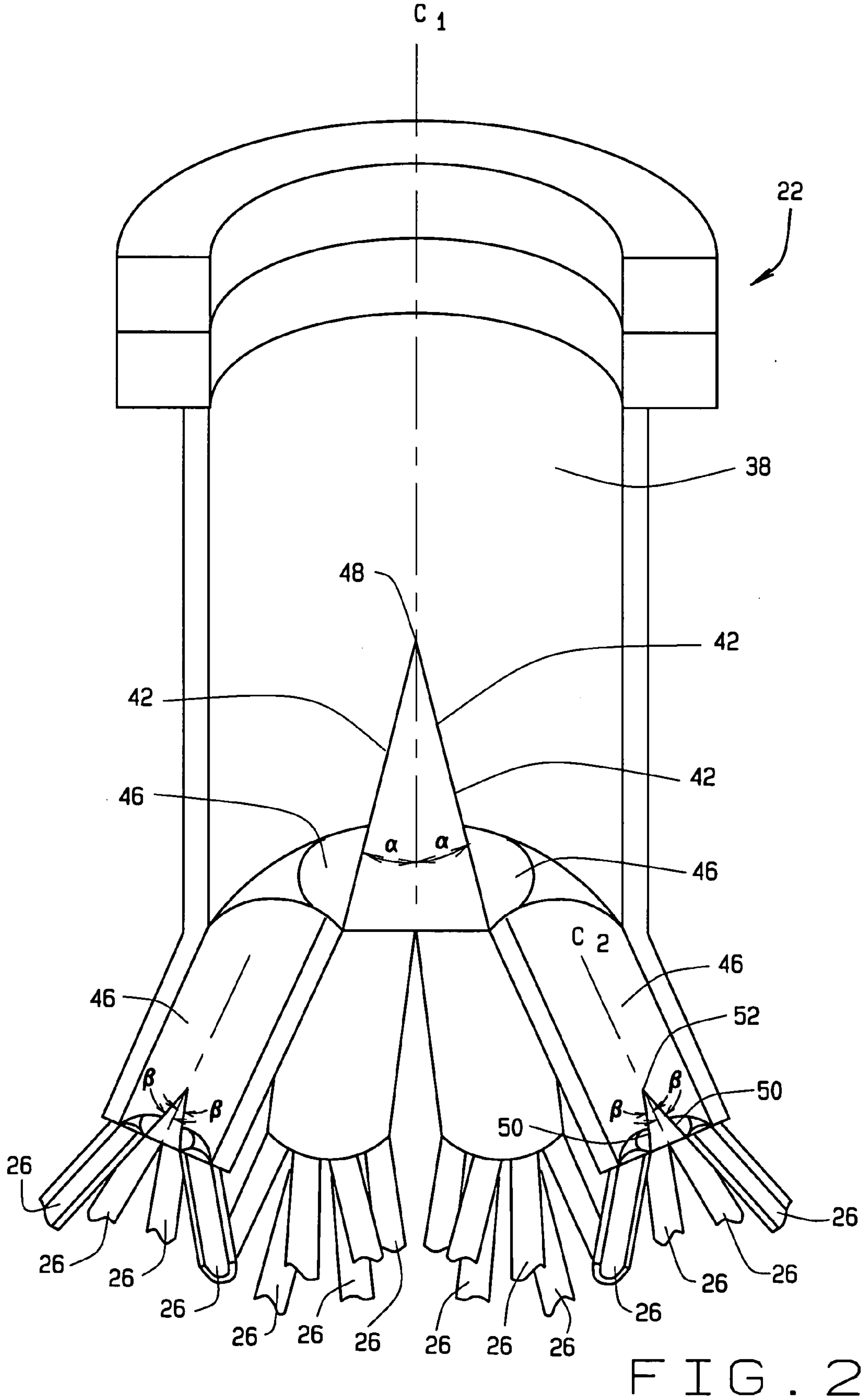
FIG. 2 is a sectional view of a two-stage slurry splitter included in the injector module shown in FIG. 1.

Referring now to FIG. 2, the two-stage slurry splitter 22 includes a main cavity 38 including a plurality of first stage flow dividers 42 and a plurality of secondary cavities 46 extending from the main cavity 38 at distal ends of the first stage flow dividers 42. The first stage flow dividers 42 divide and direct a main flow of the slurry into a plurality of secondary flows that flow into the secondary cavities 46. Since the slurry stream is a dense phase slurry stream, it is important to not have sudden changes in directional velocity of the slurry stream. Sudden changes in the directional velocity of the slurry stream cause bridging or clogging of the flow paths within the injector module 14, e.g. at the secondary cavities 46.

Particularly, as described herein, proper shaping of the first stage flow dividers 42 (and the second stage flow dividers 50, described below) and sizing of the slurry injection tubes 26 is important due to the Bingham plastic nature of gas/solids or liquid/solids slurries. Carbonaceous slurries are not Newtonian fluids, rather they are better classified as Bingham plastics. Instead of having a viscosity, carbonaceous slurries are characterized by a yield stress and a coefficient of rigidity. Therefore, any time a sheer stress at an interior wall of the two-stage slurry splitter 22 is less than the yield stress of the slurry, the flow will plug the two-stage slurry splitter 22. This is further complicated by the fact that to minimize wall erosion from the abrasive solid particles in the slurry, the slurry flow velocities must be maintained below a predetermined rate, e.g. below approximately 50 feet per second, which in turn produces low wall shear stresses at or near the plastic's yield stress.

Therefore, the first stage flow dividers 42 are designed so that the directional velocity of the slurry stream will not be changed by more than approximately 10° when the slurry stream is divided and directed into the secondary flows. Accordingly, each of the first stage flow dividers 42 forms an angle $\alpha$ with a center line $C_1$ of the main cavity that is between approximately 5° and 20°. Additionally, the first stage flow dividers 42 join at a point 48 such that the flow paths do not include any rounded or blunt bodies that the slurry particles can impact and cause bridging of the flow paths within the injector module 14, e.g. at the secondary cavities 46. Thus, as the slurry stream is divided, there are no sharp contractions or expansions within the flow paths.

Furthermore, the slurry injection tubes 26 are sized to maintain a desired slurry flow velocity within the slurry injection tubes 26, e.g. approximately 30 feet per second. To ensure good mixing between the slurry and reactant streams flowing from the annular impinging orifices 34, the slurry injection tubes 26 will have a suitable predetermined inside diameter, e.g. below approximately 0.500 inches. However, due to slurry plugging concerns the inside diameter of the slurry injection tubes 26 must be maintained above a minimum predetermined diameter, e.g. above approximately 0.200 inches. If the slurry uses gas, such as CO2, N2, or H2, as the slurry transport medium, the annular impinging orifices 34 only need to ensure good mixing between the reactants impinged on the slurry stream and therefore the slurry injection tubes 26 can have larger inside diameters, e.g. approximately 0.500 inches. However, if water is used as the slurry transport medium, the annular impinging orifices 34 must impinge the slurry stream and atomize the slurry into small drops. Therefore, the slurry injection tubes 26 must have smaller inside diameters, e.g. approximately 0.250 inches or less. Thus, for the same slurry feed rates into the gasification chamber 18, if water is used as the transport medium, the injector module 14 will require a greater number of slurry injection tubes 26 and corresponding annular impinging orifices 34 than when gas is utilized as the transport medium.

Each secondary cavity 46 includes a plurality of second stage flow dividers 50 that divide and direct the secondary flows into a plurality of tertiary flows that flow into the slurry injection tubes 26. The slurry injection tubes 26 extend from each of the secondary cavities 46 at distal ends of the second stage flow dividers 50 and inject the slurry, at high pressure, into the gasification chamber 18. Similar to the first stage flow dividers 42, it is important to not have sudden changes in directional velocity of the slurry stream at the second stage flow dividers 50. Therefore, the second stage flow dividers 50 are designed so that the directional velocity of the slurry stream will not be changed by more than approximately 10° when the slurry stream is divided and directed into the tertiary flows. Accordingly, each of the second stage flow dividers 50 forms an angle β with a center line $C_2$ of the secondary cavities 46 that is between approximately 5° and 20°. Additionally, the second stage flow dividers 50 join at a point 52 such that the flow paths do not include any rounded or blunt bodies that the slurry particles can impact and cause bridging of the flow paths within the injector module 14, e.g. at the secondary cavities 46.

In an exemplary embodiment, first stage flow dividers 42 divide the main slurry flow into six secondary flows and direct the six secondary flows into six secondary cavities 46 extending from the main cavity 38. Similarly, each second stage flow divider 50 divides the corresponding secondary slurry flow into six tertiary flows and directs the respective six tertiary flows into six corresponding slurry injection tubes 26 extending from the respective secondary cavities 46. Thus, in this exemplary embodiment, the injector module 14 is a 36-to-1 slurry splitter whereby the main slurry flow is ultimately divided into thirty-six tertiary flows that are directed into thirty-six slurry injection tubes 26.

Figure 3:
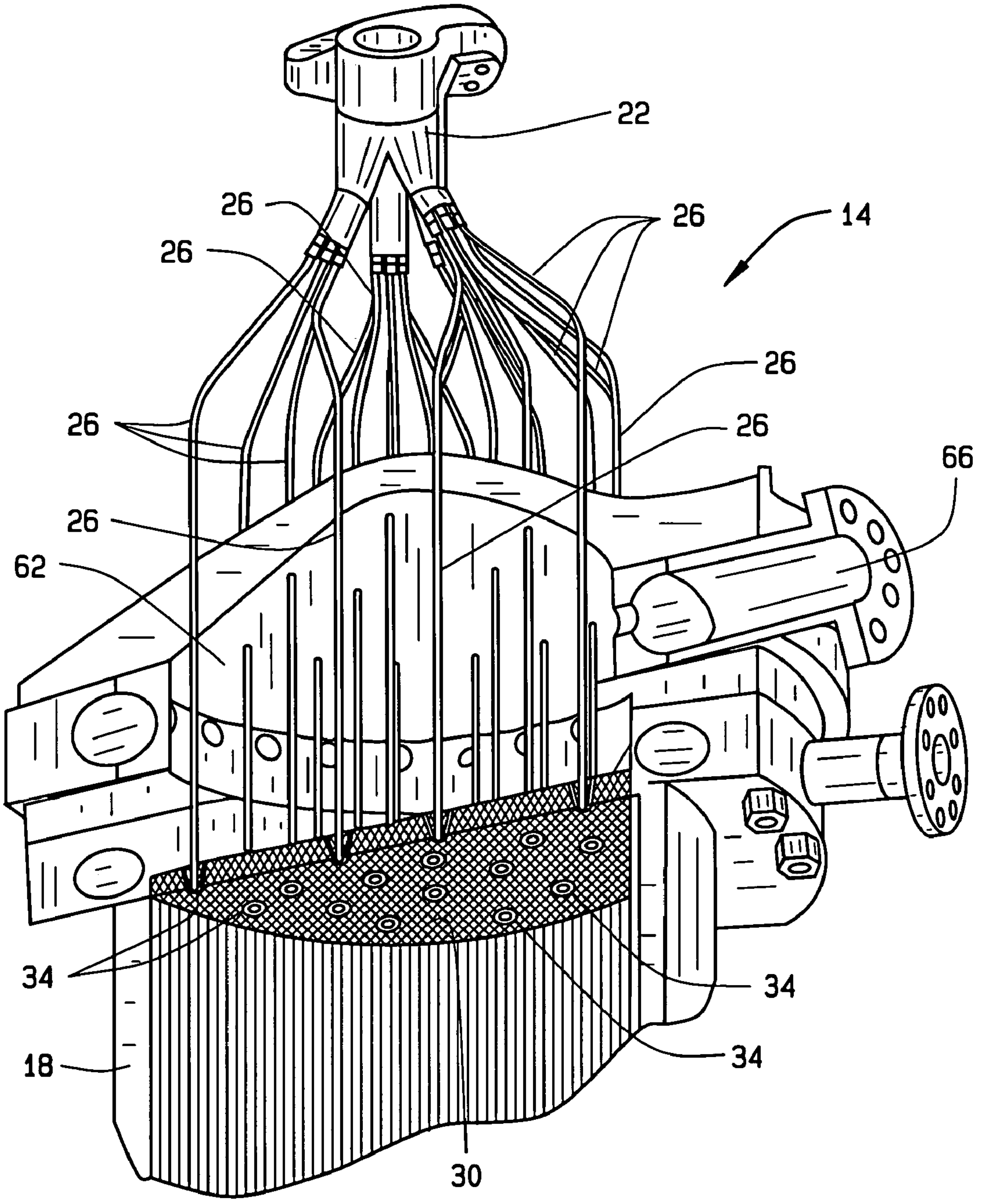
FIG. 3 is sectional view of the injector module shown in FIG. 1, illustrating one embodiment of a cooling system for an injector face plate of the injector module.
Figure 4:
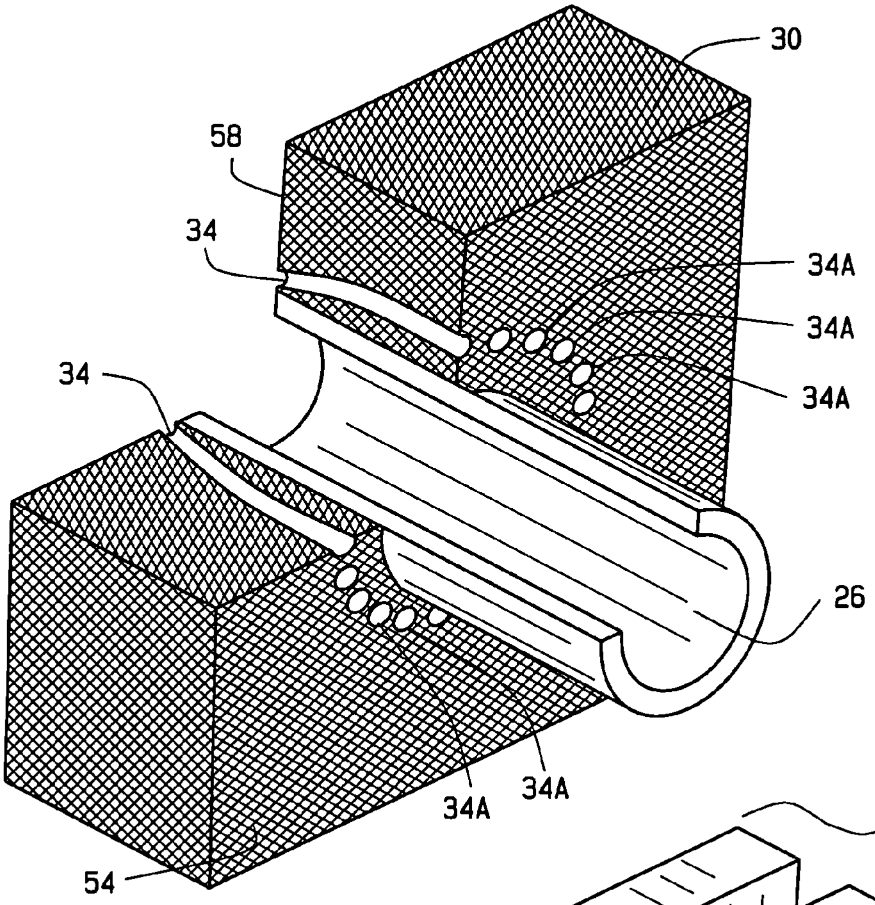
FIG. 4 is an isometric view of a portion of the injector face plate shown in FIG. 3.

Referring to FIGS. 3 and 4, in various embodiments the injector face plate 30 is fabricated of a porous metal screen having the annular impinging orifices 34 extending therethrough. In such embodiments, the injector face plate 30 can have any thickness and construction suitable to transpiration cool the injector face plate 30 so that the injector face plate 30 can withstand high gas temperatures, e.g. temperatures of approximately 5000° F. and higher, and abrasion generated by the gasification reaction. For example, the injector face plate 30 can have a thickness between approximately ⅜ and ¾ inches and be constructed of rigimesh®.

As most clearly shown in FIG. 4, the annular impinging orifices 34 comprise a plurality of apertures 34A that extend from a reactant side 54 of the injector face plate 30 through the injector face plate 30. The apertures 34A converge substantially at a gasifier side 58 of the injector face plate 30 to form an annular opening in the gasifier side 58. The reactants that impinge the slurry stream flowing from the slurry injection tubes 26 are supplied under pressure, e.g. approximately 1200 psi, to a reactant manifold dome 62 of the injector module 14 through a reactant inlet manifold 66. The pressure within the reactant manifold dome 62 forces the reactants through the annular impinging orifices 34 where the reactants impinge the slurry flowing from the slurry injection tubes 26 inside the gasification chamber 18.

The cooling system comprises transpiration of the reactants through the porous metal screen injector face plate 30. More particularly, the porosity of the injector face plate allows the reactants flow through the porous metal screen injector face plate 30, thereby cooling the injector face plate 30. However, the porosity is such that the flow of the reactants through the injector face plate 30 is significantly impeded, or restricted, so that less reactants enter the gasification chamber 18 at a greatly reduced velocity from that at which the reactants flowing through the annular impinging orifices 34, e.g. 20 ft/sec versus 500 ft/sec. For example, between approximately 5% and 20% of the reactant supplied to the reactant manifold dome 62 passes through the porous injector face plate 30, and the remaining approximately 80% to 95% passes unimpeded through the annular impinging orifices 34. Therefore, the injector face plate 30 is transpiration cooled by reactants flowing through the porous injector face plate 30 to temperatures low enough to prevent damage to the injector face plate 30, e.g. temperature below approximately 1000° F. Since the porous injector face plate 30 is transpiration cooled, that is the reactants, e.g. steam and oxygen, flow through the porous injector face plate 30, the material of construction for the face plate 30 only needs to be compatible with reactants rather than all of the other gases generated by the gasification reaction. That is, the flow of reactants through the porous injector face plate 30 prevents the more corrosive and/or abrasive gases and particles created during the gasification reaction from coming into contact with the porous injector face plate 30. In addition, the flow of reactants through the porous injector face plate 30 prevents slag corrosion from occurring on the porous injector face plate 30, because the transpiration flow suppresses all recirculation zones within the gasification chamber 18 that would otherwise bring molten slag into contact with the porous injector face plate 30.

Figure 6:
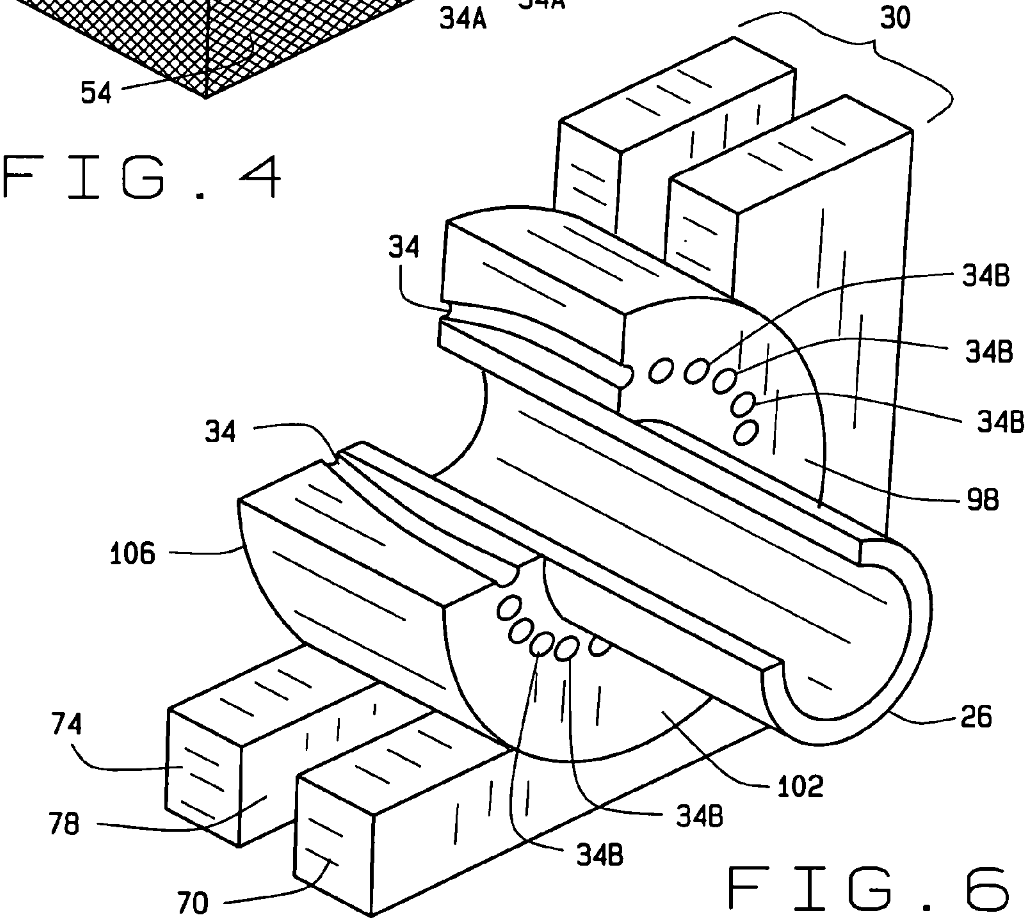
FIG. 6 is an isometric view of a reactant side of a portion of the injector face plate shown in FIG. 5.
Figure 5:
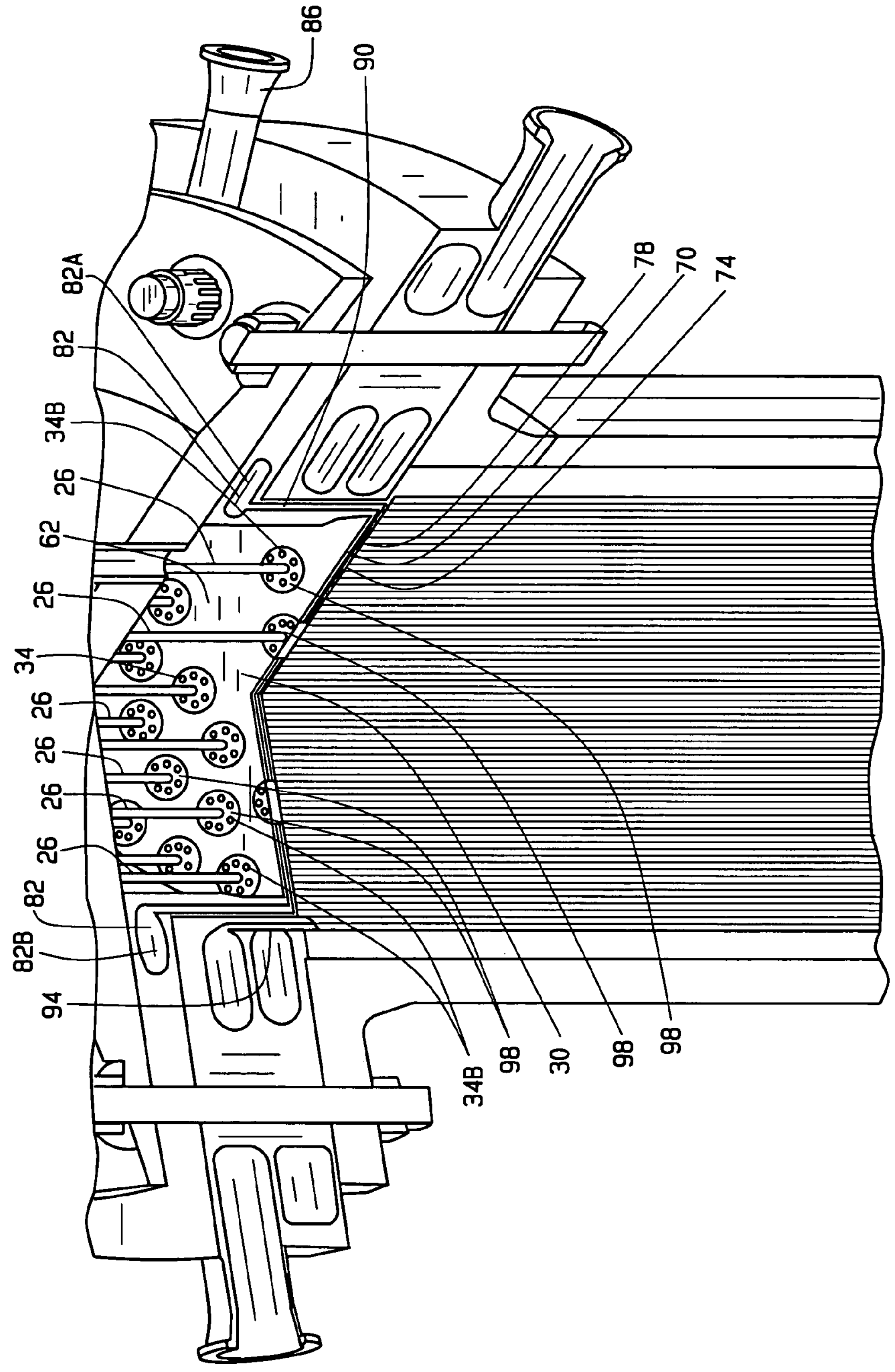
FIG. 5 is a sectional view of the injector module shown in FIG. 1, illustrating another embodiment of a cooling system for the injector face plate.
Figure 7:
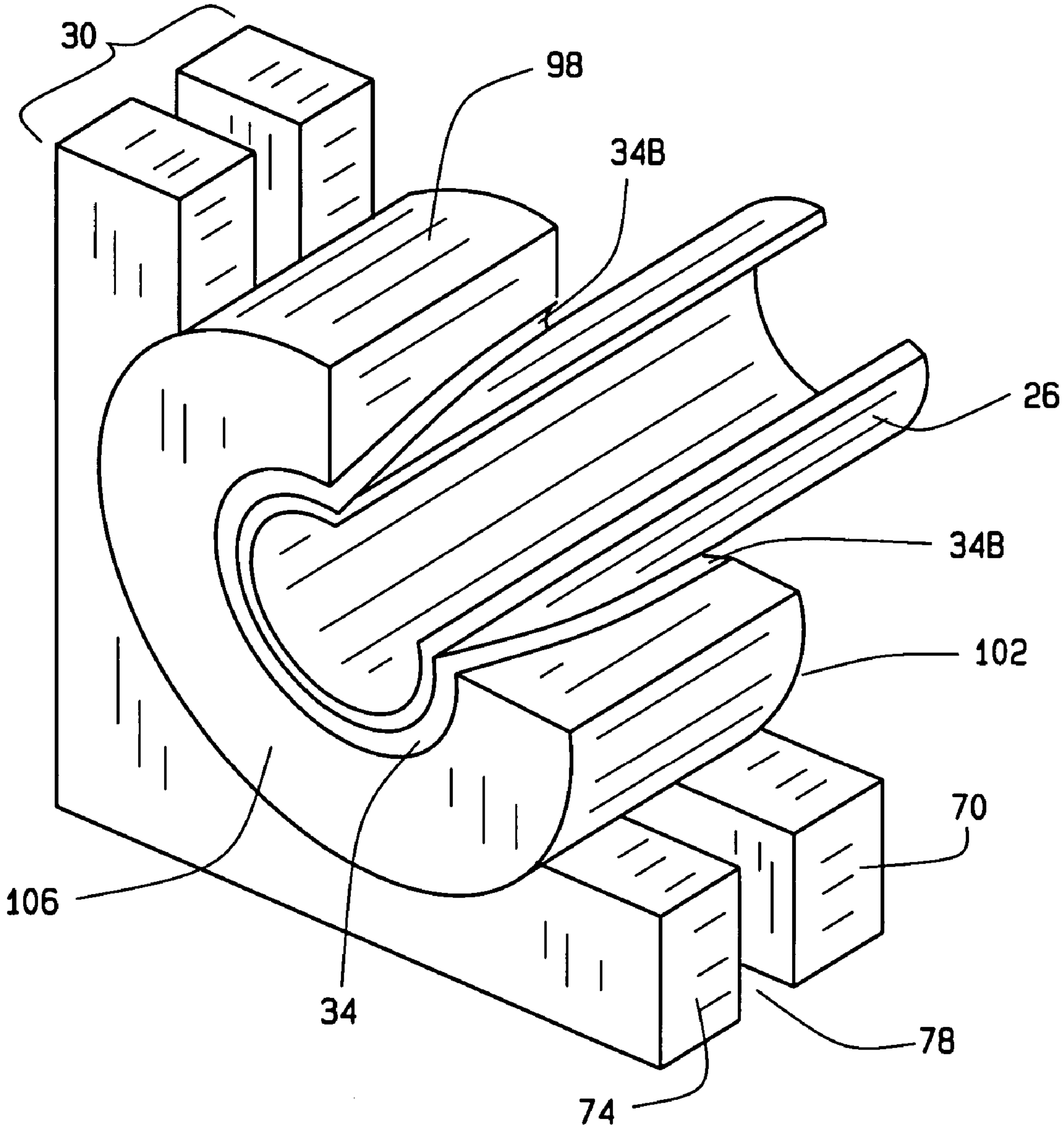
FIG. 7 is an isometric view of a gasifier side of a portion of the injector face plate shown in FIG. 5.

Referring now to FIGS. 5, 6 and 7, in various other embodiments, the injector face plate 30 includes a reactant-side plate 70, a gasifier-side plate 74 and a coolant passage 78 therebetween. The cooling system comprises the coolant passage 78 through which a coolant is passed at high pressure and moderate velocity, e.g. approximately 1200 psi and 50 ft/sec, to cool the gasifier-side plate 74. More particularly, a coolant, such as steam or water, is supplied to an annular coolant channel inlet portion 82A through a coolant inlet manifold 86. The coolant flows from the annular coolant channel inlet portion 82A to the coolant passage 78 via a coolant inlet transfer passage 90 extending therebetween. The coolant then flows across the coolant passage 78 to an annular coolant outlet portion 82B via a coolant outlet transfer passage 94, where the coolant exits the injector module 14 via a coolant exit manifold (not shown). Generally, the annular coolant channel inlet portion 82A and the annular coolant channel outlet portion 82B form a toroidal coolant channel 82 that is divided in half such that the coolant is forced to flow across the coolant passage 78, via the transfer passages 90 and 94.

In an exemplary embodiment, water is used as the coolant. The water is supplied at approximately 1200 psi at a temperature between approximately 90° F. and 120° F. The water coolant traverses the coolant passage 78 cooling the gasifier-side plate 74 and exits the injector module 14 at a temperature between 250° F. and 300° F.

In one embodiment, the coolant passage 78, i.e. the gap between the reactant-side plate 70 and the gasifier-side plate 74 is between approximately ⅜ and ½ inches thick. The gasifier-side plate 74 can be fabricated from any metal, alloy or composite capable of withstanding ash laden acid gas corrosion and abrasion at temperature below approximately 600° F. generated at the gasifier-side plate 74 by the gasification reaction. For example, the gasifier-side plate 74 can be fabricated from a transition metal such as copper or a copper alloy known as NARloy-Z developed by the North American Rockwell Company. Additionally, the gasifier-side plate 74 can have any thickness suitable to maintain low thermal heat conduction resistances, e.g. between approximately 0.025 and 0.250 inches.

Still referring to FIGS. 5, 6 and 7, the injector module 14 further includes a plurality of impinging conic elements 98 that extend through the reactant-side plate 70, the coolant passage 78 and the gasifier-side plate 74. The impinging conic elements 98 are fitted within, coupled to and sealed with the reactant-side plate 70 and the gasifier-side plate 74 such that coolant flowing through the coolant passage 78 will not leak into either reactant manifold dome 62 or the gasification chamber 18. Each impinging conic element 98 is fitted around an end of a corresponding one of the slurry injection tubes 26 and includes one of the annular impinging orifices 34. In an exemplary embodiment, the slurry injection tubes 26 are embedded into the impinging conic elements 98 and sealed with metal bore seal rings (not shown). As can be appreciated from at least FIG. 5, each of the impinging conic elements 98 is cylindrical in shape and includes a bore surface defining a central orifice that receives the correspondence one of the slurry injection tubes 26. In this regard, the annular impinging orifices 34 are located radially outwards of the central orifice. The bore surface is fitted against the end of the corresponding slurry injection tube 26. In this example, the impinging conic element 98 includes an end face that is flush with an end face of the corresponding slurry injection tube 26. Additionally, each of the annular impinging orifices 34 are unimpeded between ends of the respective impinging conic elements 98 with regard to any features within the annular impinging orifices. That is, the annular impinging orifices 34 do not include vanes or swirlers that direct or impede the throw through the orifices 34. Since any leaks between the slurry injection tubes 26 and the impinging conic elements 98 will only flow additional reactant, e.g. steam and oxygen, from the reactant manifold dome 62 into the gasification chamber 18, it is not necessary that seal between the slurry injection tubes 26 and the impinging conic elements 98 be completely, e.g. 100%, leak-proof.

As most clearly shown in FIGS. 6 and 7, the annular impinging orifices 34 comprise a plurality of apertures 34B that extend from a reactant side 102 of the impinging conic elements 98, through the impinging conic element 98 and converge substantially at a gasifier side 106 of the conic impinging elements 98 to form an annular opening in the gasifier side 106. The reactants that impinge the slurry stream flowing from the slurry injection tubes 26 are supplied under pressure to the reactant manifold dome 62 of the injector module 14 through a reactant inlet manifold 66 (shown in FIG. 3). The pressure within the reactant manifold dome 62 forces the reactants through the annular impinging orifices 34 where the reactants impinge the slurry flowing from the slurry injection tubes 26 inside the gasification chamber 18.

Figure 8:
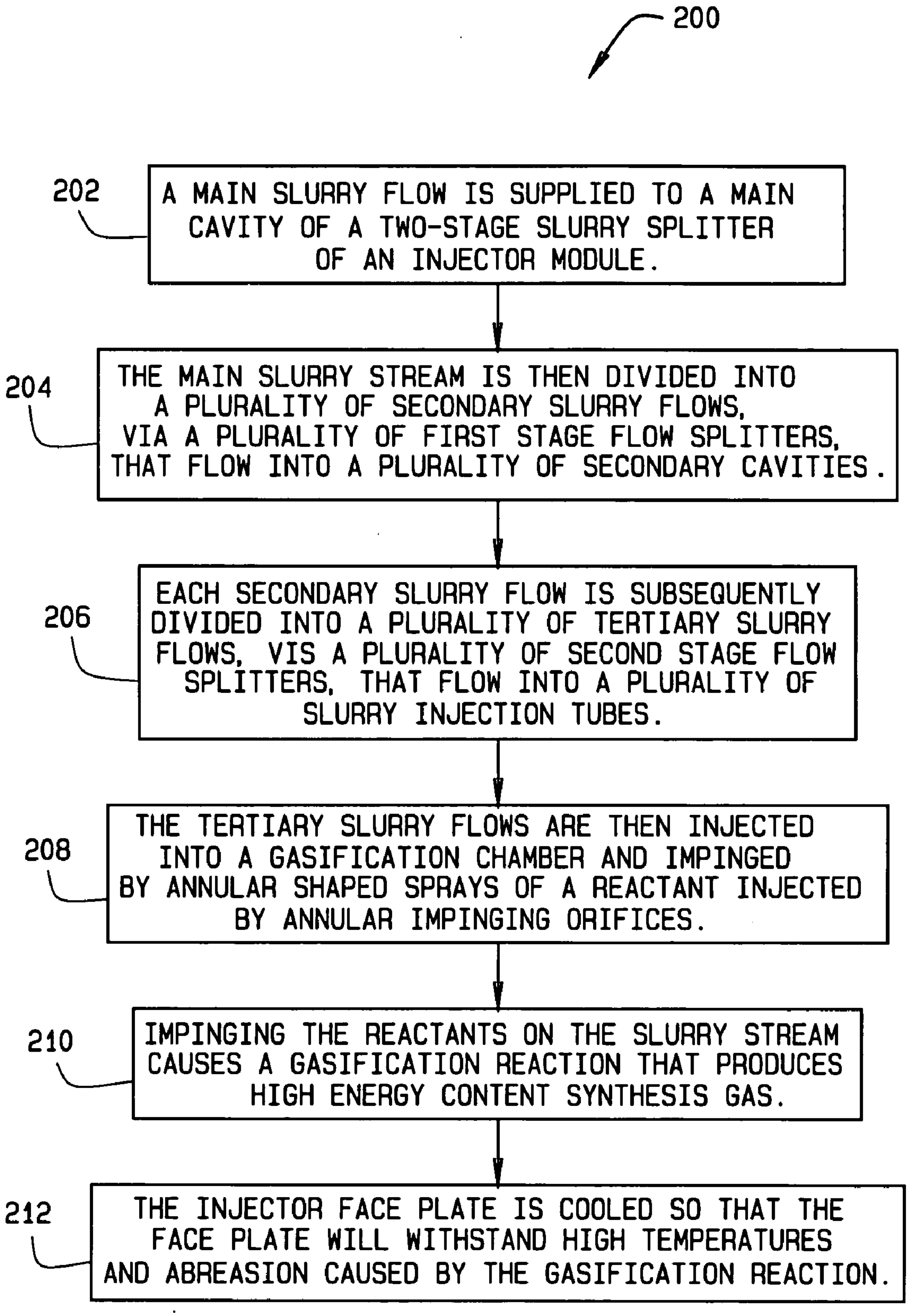
FIG. 8 is a flow chart illustrating a method for gasifying carbonaceous materials utilizing the gasification system shown in FIG. 1.

FIG. 8 is a flow chart 200, illustrating a method for gasifying carbonaceous materials utilizing the gasification system 10, in accordance with various embodiments of the present inventions. Initially, a main slurry flow is supplied to the main cavity 38 of the two-stage slurry splitter 22, as indicated at 202. The main slurry stream is then divided into a plurality of secondary slurry flows, via the first stage flow splitter 42, that flow into the secondary cavities 46, as indicated at 204. Each secondary slurry flow is subsequently divided into a plurality of tertiary slurry flows, via the second stage flow splitters 50, that flow into the plurality of slurry injection tubes 26, as indicated at 206. The tertiary slurry flows are then injected into the gasification chamber 18 and impinged by annular shaped sprays of the reactant injected by the annular impinging orifices 34, as indicated at 208. Impinging the reactants on the slurry stream causes the gasification reaction that produces high energy content synthesis gas, for example, hydrogen and carbon monoxide, as indicated at 210. Finally, the injector face plate 30 is cooled so that the face plate 30 will withstand high temperatures and abrasion caused by the gasification reaction generated by impinging the reactant onto the tertiary slurry flows, as indicated at 212.

In various embodiments, the injector face plate 30 is cooled by fabricating the injector face plate 30 of a porous metal, and transpiring the reactant through the porous metal face plate 30. In such embodiments, the annular impinging orifices 34 are formed within the porous injector face plate 30 and the reactant is forced through each of the annular impinging orifices 34.

In various other embodiments, the injector face plate 30 comprises the reactant-side plate 70, the gasifier-side plate 74 and the coolant passage 78 therebetween. The injector face plate 30 is then cooled by passing a coolant through the coolant passage 78 to cool the gasifier-side plate 74. In such embodiments, the annular impinging orifices are fitted within the injector face plate 30 such that each impinging conic element 98 extends through the reactant-side plate 70, the cooling passage 78 and the gasifier-side plate 74. Each conic element 98 includes one of the annular impinging orifices 34 that impinges an annular shaped spray of reactant onto the slurry stream flowing from the corresponding slurry injection tube 26.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An injector module for a gasifier, said injector module comprising:

a two-stage slurry splitter;

a plurality of slurry injection tubes extending from the two-stage slurry splitter;

an injector face plate having the slurry injection tubes extending therethrough, the injector face plate including a reactant-side plate, a gasifier-side plate and a coolant passage between the reactant-side plate and the gasifier-side plate through which a coolant is passed for cooling the injector face plate;

a plurality of impinging conic elements extending through the reactant-side plate and the gasifier-side plate, each impinging conic element including a bore surface defining a central orifice that receives one of the slurry injection tubes such that the impinging conic element is fitted at an end of the respective slurry injection tube; and a plurality of annular impinging orifices incorporated into the injector face plate, each annular impinging orifice surrounding a corresponding slurry injection tube and extending through a respective one of the plurality of impinging conic elements.

2. The injector module of claim 1, wherein the two-stage slurry splitter comprises:

a main cavity including a plurality of first stage flow dividers; and a plurality of secondary cavities extending from the main cavity at distal ends of the first stage flow dividers, each secondary cavity including a plurality of second stage flow dividers, wherein a plurality of the slurry injection tubes extend from each of the secondary cavities at distal ends of the second stage flow dividers.

3. The injector module of claim 1, wherein the injector face plate comprises a porous metal screen having the annular impinging orifices extending therethrough and the cooling system comprises the porous metal screen that is transpiration cooled by reactants flowing through the porous metal screen face plate.

4. The injector module of claim 1, wherein the gasifier-side plate comprises a transition metal.

5. The injector module of claim 1, wherein each impinging conic element includes one of the annular impinging orifices.

6. A gasifier system, said gasifier comprising:

a gasification chamber wherein a high pressure dry slurry stream is impinged by a high pressure reactant to generate a gasification reaction that converts the dry slurry into a synthesis gas; and an injector module coupled to the gasification chamber for injecting the high pressure dry slurry stream into the gasification chamber and impinging the high pressure reactant onto the high pressure dry slurry stream, the injector module comprising:

a two-stage slurry splitter;

a plurality of slurry injection tubes extending from the two-stage slurry splitter and adapted to inject the dry slurry into the gasification chamber;

an injector face plate having the slurry injection tubes extending therethrough, the injector face plate including a reactant-side plate, a gasifier-side plate and a coolant passage between the reactant-side plate and the gasifier-side plate through which a coolant flows to cool the gasifier-side plate;

a plurality of impinging conic elements extending through the reactant-side plate, the coolant passage and the gasifier-side plate, each impinging conic element including a bore surface defining a central orifice that receives one of the slurry injection tubes such that the impinging conic element is fitted at an end of the respective slurry injection tube; and a plurality of annular impinging orifices incorporated into the injector face plate, each annular impinging orifice surrounds a corresponding slurry injection tube and extends through a respective one of the plurality of impinging conic elements, and each annular impinging orifice is adapted to impinge the reactant onto the dry slurry stream injected by the corresponding slurry injection tube to generate the gasification reaction.

7. The gasifier system of claim 6, wherein the two-stage slurry splitter comprises a main cavity including a plurality of first stage flow dividers adapted to divide and direct a main flow of the dry slurry into a plurality of secondary flows that flow into a plurality of secondary cavities extending from the main cavity at distal ends of the first stage flow dividers.

8. The gasifier system of claim 7, wherein the secondary cavities of the two-stage slurry splitter include a plurality of second stage flow dividers adapted to divide and direct the secondary flows into a plurality of tertiary flows that flow into the slurry injection tubes that extend from each of the secondary cavities at distal ends of the second stage flow dividers.

9. The gasifier system of claim 7, wherein the injector face plate comprises a porous metal screen having the annular impinging orifices extending therethrough and the cooling system comprises the porous metal screen injector face plate that is transpiration cooled by reactants flowing therethrough.

10. The gasifier system of claim 7, wherein the gasifier-side plate comprises a transition metal.

11. The gasifier system of claim 7, wherein each impinging conic element includes one of the annular impinging orifices.

12. The injector module of claim 1, wherein the two-stage slurry splitter includes a 36:1 flow split ratio between a main input and a tertiary output.

13. The injector module of claim 1, wherein the two-stage slurry splitter includes first stage flow dividers and second stage flow dividers, and the first stage flow dividers and the second stage flow dividers include split angles of not more than 10°.

14. The injector module of claim 1, wherein the two-stage slurry splitter includes first stage flow dividers and second stage flow dividers, and the first stage flow dividers and second stage flow dividers include split angles of 5°-20°.

15. The injector module of claim 4, wherein the transition metal is selected from a group consisting of copper and copper alloy.

16. The injector module of claim 1, wherein each of the plurality impinging conic elements is cylindrical.

17. The injector module of claim 1, wherein the annular impinging orifices of a given one of the impinging conic elements are located radially outwards with regard to the central orifice.

18. The injector module of claim 1, wherein the bore surface is fitted against the end of the respective slurry tube.

19. The injector module of claim 1, wherein an end face of each of the impinging conic elements is flush with an end face of the respective slurry tube that the impinging conic element is fitted with.

* * * * *